No. 806,791. PATENTED DEC. 12, 1905.
J. B. FOOTE.
WIRE CUTTING DEVICE.
APPLICATION FILED MAY 22, 1905.
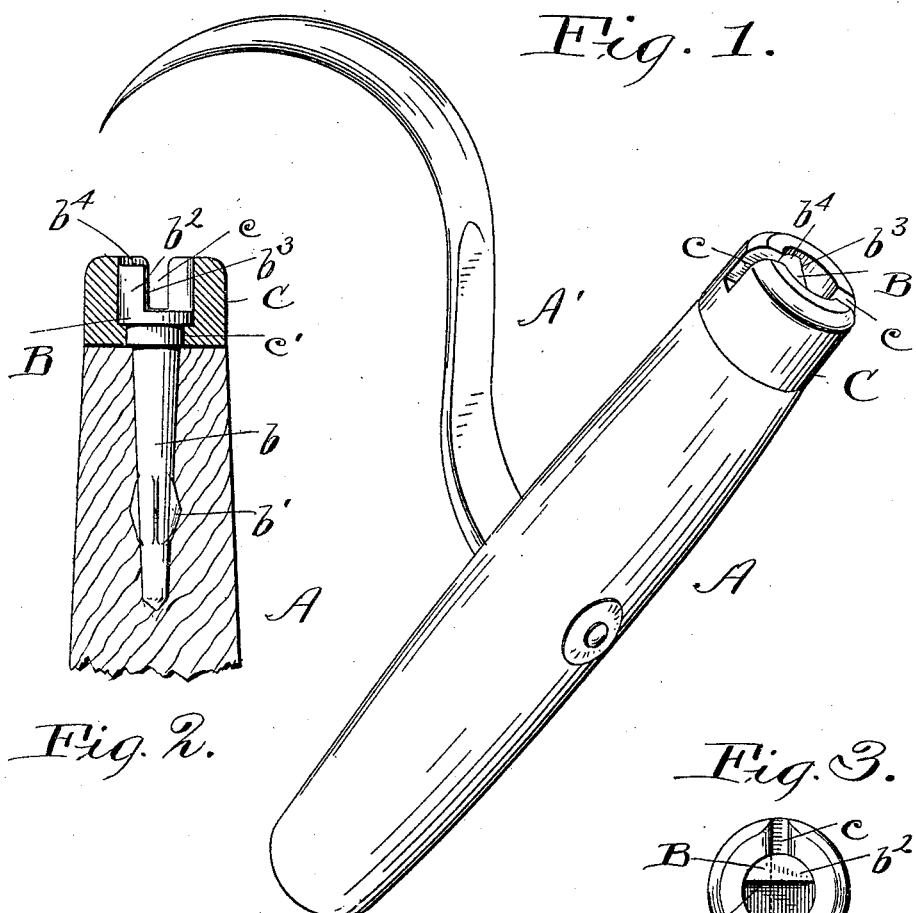
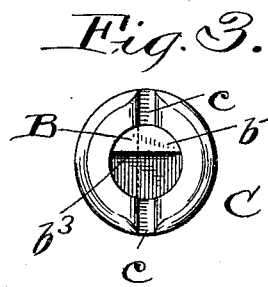
Witnesses.
E. B. Gilchrist
N. L. Bresnan
Inventor
James Bedell Foote,
By his Attorneys,
Thurston & Bates

UNITED STATES PATENT OFFICE.

JAMES BEDELL FOOTE, OF FREDERICKTOWN, OHIO.

WIRE-CUTTING DEVICE.

No. 806,791.   Specification of Letters Patent.   Patented Dec. 12, 1905.

Application filed May 22, 1905. Serial No. 261,732.

*To all whom it may concern:*

Be it known that I, JAMES BEDELL FOOTE, a citizen of the United States, residing at Fredericktown, in the county of Knox and State of Ohio, have invented a certain new and useful Improvement in Wire-Cutting Devices, of which the following is a full, clear, and exact description, reference being had to the accompanying drawings.

The object of this invention is to provide a very simple and efficient tool for cutting wire. The tool is particularly provided for wire which is already stretched, as the wire around hay bales, wire fences, &c. The device is so small that it can be very conveniently mounted on the handle of some tool usually employed in connection with the wire or bale—as, for example, a hook used in handling a hay bale or a hammer used in mending fences.

The invention consists, essentially, of a head carried by a handle and a slotted sleeve surrounding the head and adapted to turn relative thereto, so that when the slot is placed astride the wire the handle may turn the head to shear the wire.

The invention is hereinafter more fully described and its essential characteristics set out in the claims.

The drawings show the invention as applied to a hay-hook.

Figure 1 is a perspective view of such hook and wire-cutter complete. Fig. 2 is a section through the wire-cutter and the adjacent portion of the handle. Fig. 3 is an end view of the wire-cutter.

Referring to the parts by letters, A represents the handle of a hay-hook A'. This handle constitutes also the handle of my wire-cutter, which comprises the stationary head B and the rotatable sleeve C. The sleeve C has slots $c$ in its walls, these slots being shown as diametrically opposite. Near the base of the bore of the sleeve the bore is reduced by an inwardly-extending flange $c'$. The head B is cylindrical, occupying the bore of the sleeve. At the base of this head is a shank $b$, which passes through the central opening of the flange $c'$ into the handle A. This shank is prevented from turning in the handle by making the shank angular or by forming wings on its opposite sides. As is shown in the drawings, the shank has wings $b'$ formed on its opposite sides. It may thus be forced into the wooden handle and will securely hold itself rigidly therewith.

The head B is cut away preferably for about half of its cross-section, so that it leaves a segmental extension $b^2$, having an edge $b^3$ adjacent to the edge of each of the slots $c$. If these slots are placed astride a stretched wire (the wire extending across the extension $b^2$ of the head,) and the handle is turned, the edge $b^3$ will bite and shear off the wire, the tension of the wire preventing the sleeve turning and wrapping the wire around it.

The extreme end $b^4$ of the head lies within the end of the sleeve C. Owing to this construction the slots $c$ may be placed astride the wire whatever the position of the head. Then by turning the handle in one direction or the other the head is brought into position to allow the wire to pass farther into the slots $c$ and in front of the edges $b^3$. Then a turning of the handle A shears off the wire. In such turning the hook A' furnishes a very convenient lever to give a very easy cutting operation. Figs. 1 and 3 show the head in some accidental position crosswise of the slot. After the slot has been placed astride the wire the turning of the handle brings the head into the position shown in Fig. 2 and by dotted line in Fig. 3, allowing the complete entrance of the wire.

My wire-cutter is so small that it does not add perceptibly to the weight of the tool to which it is applied, and it need not add to the bulk of the tool, for the outer surface of the sleeve C may constitute really an extension of the handle. The device is durable and very efficient in service. It simply has to be placed astride the wire and the handle turned to cut the wire.

Having thus described my invention, I claim—

1. A wire-cutter comprising a head, a slotted sleeve surrounding the same, the head having a cutting edge adapted to coöperate with the edge of the sleeve to shear a wire in the slot.

2. The combination of a handle, a head rigidly secured thereto, a sleeve loosely journaled on the head and having slots in its wall, the head having an extension adapted to engage a wire occupying the slots.

3. The combination of a head, a surrounding sleeve having slots through its wall, the head having an extension adapted to stand between a wire occupying the slots and the wall of the sleeve, said extension terminating some distance within the end of the sleeve.

4. In a wire-cutter, the combination of a cylindrical head having an extension which is a segment of the cylinder, and a sleeve surrounding the head and movable relative thereto and having slots through its opposite walls.

5. In a wire-cutter, the combination of a head having a shearing edge, and a sleeve surrounding the head and movable relative thereto and having slots through its opposite walls, said head having a reduced shank, and said sleeve having an inward flange loosely surrounding said shank.

6. In a wire-cutter, the combination of a handle, a cylindrical head having a segmental extension and a reduced shank, said shank extending rigidly into the handle, a sleeve having a cylindrical bore which said head occupies and having an inwardly-extended flange surrounding the shank between the head and the end of the handle, said sleeve having its opposite walls slotted, and said head having an extension adapted to engage and shear a wire held in the head.

In testimony whereof I hereunto affix my signature in the presence of two witnesses.

JAMES BEDELL FOOTE.

Witnesses:
ALBERT H. BATES,
N. L. BRESNAN.